(12) United States Patent
Danisch et al.

(10) Patent No.: US 7,296,363 B2
(45) Date of Patent: Nov. 20, 2007

(54) SHAPE-ACCELERATION MEASUREMENT DEVICE AND METHOD

(75) Inventors: Lee Danisch, Upper Kingsclear (CA); Murray Lowery-Simpson, Hanwell (CA)

(73) Assignee: N.B. Inc., Fredricton, NB (CA)

( * ) Notice: Subject to any disclaimer, the term of this patent is extended or adjusted under 35 U.S.C. 154(b) by 197 days.

(21) Appl. No.: 11/160,401

(22) Filed: Jun. 22, 2005

(65) Prior Publication Data

US 2005/0284221 A1    Dec. 29, 2005

(30) Foreign Application Priority Data

Jun. 25, 2004    (CA) .................................... 2472421

(51) Int. Cl.
*G01B 5/20*    (2006.01)

(52) U.S. Cl. .............................. 33/556; 33/557; 33/503

(58) Field of Classification Search .......... 33/556–558, 33/503, 551–552, 355 R
See application file for complete search history.

(56) References Cited

U.S. PATENT DOCUMENTS

| 5,321,257 | A |   | 6/1994  | Danisch |
|-----------|---|---|---------|---------|
| 5,633,494 | A |   | 5/1997  | Danisch |
| 5,673,528 | A |   | 10/1997 | Danisch |
| 5,953,683 | A | * | 9/1999  | Hansen et al. ............ 33/355 R |
| 6,127,672 | A |   | 10/2000 | Danisch |
| 6,563,107 | B2|   | 5/2003  | Danisch et al. |

* cited by examiner

*Primary Examiner*—Yaritza Guadalupe-McCall
(74) *Attorney, Agent, or Firm*—McFadden, Fincham

(57) ABSTRACT

The present invention provides for a sensor array having at least one field-measuring sensor and at least one curvature-measuring sensor within a flexible substrate, the field-measuring sensors capable of providing orientation data of the flexible substrate relative to a field and the curvature-measuring sensors capable of providing relative orientation data within the substrate, for measuring dynamic and static shapes and vibration of geotechnical, structural and biological bodies.

21 Claims, 9 Drawing Sheets

SHAPE-ACCELERATION MEASUREMENT DEVICE AND METHOD

The present application claims priority to Canadian Patent Application No. 2,472,421 filed Jun. 25, 2004.

FIELD OF THE INVENTION

The present invention relates to a sensor array for measurement. More particularly, the present invention is directed to a method and apparatus for sensing the shape and acceleration of objects and pathways.

BACKGROUND OF THE INVENTION

It is well known in the fields of Geology and Earth Science to use tilt sensors to measure the paths of boreholes. Typically, a tilt sensor is a tubular form containing electrolytic, resistive, capacitive, 'zero-displacement', or micromachined silicon gravity sensors arranged to sense two degrees of freedom (DOFs) of tilt relative to the gravity field. Normally the two DOFs are orthogonal, and are termed x and y components of tilt. The tilt sensor may be lowered into a borehole and tilt data taken at intervals. Or, several tilt sensors may be arranged one above the other in the borehole and used to detect changes in tilt at known locations. It is also known to use accelerometers lowered into boreholes to measure earthquake vibrations, including s-waves and p-waves. S-waves produce accelerations predominantly parallel to the Earth's surface. It is also known to use magnetic sensors to determine the orientation of sensors in the Earth's magnetic field, including sensors in boreholes.

In addition to boreholes, the above methods are applied to structures such as bridges and buildings, mineshafts, and sensors attached to or buried in the earth or earthworks.

A deficiency of the above tilt sensor methods is the inability to provide continuous real-time measurement and/or to track dynamic shapes. Most of the current tilt sensor technologies do not measure dynamic acceleration such as s-waves during an earthquake. A further deficiency is the lack of a calibrated, deformable, portable substrate to hold the sensors and protect them from water and mechanical forces. A further deficiency is the requirement for a larger number of sensors because the tilt sensors are not arranged within a calibrated structure or a twist-free structure, so that magnetic measurement of orientation about the gravity vector is required.

It is also known to use bend-sensing and bend-and-twist-sensing arrays to measure the dynamic and static shapes of boreholes, buildings, persons, instruments, and geological structures. Examples include Danisch, L. A., Fiber optic bending and position sensor including a light emission surface formed on a portion of a light guide, U.S. Pat. No. 5,321,257, Jun. 14, 1994; Danisch, L. A., Fiber optic bending and position sensor with selected curved light emission surfaces, U.S. Pat. No. 5,633,494, May 27, 1997, Danisch, L. A., Fiber optic bending and position sensor, European Patent No. EP 0 702 780, Oct. 22, 1997, Danisch, L. A., Topological and motion measuring tool, U.S. Pat. No. 6,127,672, Oct. 3, 2000, and Danisch, L. A., Topological and motion measuring tool, U.S. Pat. No. 6,563,107.

In Danisch '672, a 2 DOF bend-sensing array is described that can be used to map a path in 3D. By adding twist as a third DOF (see Danisch, L. A., '107) the sensors in the array can rotate at joints or continuously along the long axis. Danisch, L. A. '107 describes surface-mapping arrays using curvature sensors to measure angles between elements of the surfaces. These sensor arrays use curvature sensors to measure angles along deformable surfaces. Often the sensors are modified optical fibers. A deficiency of 2 DOF bend-sensing arrays or 3 DOF bend-twist-sensing arrays in their most common form is their inability to measure accurately the small angles encountered in many applications including borehole measurements. Although they can resolve small angles over a short time period, drift causes inaccuracies that are a problem for long-term measurements. Inaccuracy may be surmounted by using 2 DOF and 3 DOF couplings between stiff members, and measuring the DOFs of the couplings with highly accurate encoders. However, this leads to great cost and complexity that makes it unlikely they would be used for long-term measurement of deformations.

In Danisch '672 and Danisch '107 surfaces are measured relative to a reference surface in 6 DOF by knowing the angular relationships between elements of the surfaces. The absolute angles of the elements in the 'World Coordinate System' (WCS) are not measured directly. They are calculated by integrating the angular relationships, or 'local' angles between elements, which are measured by bend sensors. For instance, rods connected by hinges that are all bent in the same vertical plane might have local hinge angles of 10, 20, −10, and 30 degrees. Relative to a reference rod that is horizontal in the World Coordinate System, the WCS angles between the rods are 10, 30, 20, and 50 degrees, obtained by integrating (adding) the local angles along the path. If the lengths of the rods are known and their WCS angles have been determined then the path of the rod system is completely determined.

When the connections between the rods allow for additional DOFs, such as multiaxial bend and twist, then there are 2 or 3 angular DOFs between the rods and the integration requires 3D mathematics. 3D space curve mathematics can be used and are described in Danisch '672 and Danisch '107. Deformable surfaces or volumes, not just collections of rods, may be measured in this way if the angular interrelationships are measurable and the locations of the sensors on the surfaces are known. The measurements are subject to significant errors for all portions of the surface calculated beyond the location of any angular error. Further, drift in the sensors can lead to inaccuracies in shape that must be corrected by putting the surfaces back into a previously captured pose and removing offsets to restore the measured shape to that of the captured pose. However, the measurements are useful because they may be performed with very thin arrays of optical fibers and at very high speed, such as 10,000 frames per second or more for rapidly changing shapes.

For static shapes it is possible to use accelerometers with a frequency response that extends to a constant or 'DC' acceleration, so that outputs are responsive to the gravity field, which has a constant acceleration of approximately 9.8 m/s/s. Accurate, low cost, miniature devices made by micromachining silicon (MEMs or MicroMachined ElectroMechanical Sensors) are available in single and dual axis forms. An example is the Analog Devices Inc. ADXL311 integrated circuit which has a response to acceleration from DC to thousands of Hertz (Hz). Dual-axis MEMs devices can resolve sub-degree tilts and maintain high accuracy over many years and a wide temperature range. If an array of these is placed on a deformable surface, an array of tilt signals can be generated that represents the WCS angles of the attachment locations. If the distances between locations are known, the path, surface, or volume shape can be determined to high accuracy. Unlike shape measurements based on integration of local angles, shape measurements based on directly-measured WCS angles are not subject to accumulating errors and can be much more accurate. Alternatives to MEMs sensors include electrolytic tilt sensors, capacitive tilt sensors, inductive tilt sensors, and zero-displacement accelerometers that keep a mass centered in a measuring frame and determine the forces necessary to do so. However, the disadvantage of all prior-art tilt-sensing arrays is that measurements must be made while the shapes are unchanging.

If an array is formed of MEMs acceleration sensors with a wide range of frequency response, the sensors will respond to static acceleration fields like gravity and also to rapidly-changing fields like earthquake vibration. The electronics and software may be arranged to provide output data that represent a long-term average of the total signal (slow data), and other output data that represent only the rapidly-changing components (fast data). The slow data represent the response to gravity and the fast data represent the response to vibration or other rapid movement of the array within the gravity field. The slow data are obtained by averaging many frames of data and otherwise excluding rapidly-changing signals using standard filtering techniques. The fast data are obtained by subtracting the slow data from unfiltered total data. This prior-art technique of obtaining slow and fast data is well-known. If the fast data integrates to zero over time in the filter, then accurate slow data representing the mean shape are obtained. If the mean shape is unchanging, or changing only very slowly, then the fast data represents the vibration present at each sensor within the array. Thus, the array may be used to obtain a static shape from WCS tilt angles (slow data) while the fast data are used to define the vibration applied to the array at each sensor.

SUMMARY OF THE INVENTION

The present invention provides for a calibrated combination of sensors, and measurement and calibration methods that allows accurate measurement of both static and dynamic shapes of deformation and acceleration in a single system that is optimized for field installation at low cost. It will be shown that by integrating angles along paths and measuring and differentiating angles within a field, it is possible to greatly improve on the accuracy of prior art methods. Further, packaging techniques are disclosed that combine measurement, shielding, and sealing functions, leading to low-cost, portable integrated measurement tools.

It is possible to have a shape changing rapidly, so that accelerations are due to the movements of elements of the array and to changes in orientation relative to the gravity field (tilt changes) at the same time. There may also be an overall vibration field. In these cases the shape and vibration cannot be separated into separate output data sets based on acceleration alone. In an embodiment of the invention, sensors measuring local angles (bend or bend and twist) are used exclusively at these times of dynamic change to determine the changing shape. Signals from both local and WCS angle sensors may be used to determine that a transition from static to dynamic shape has occurred. The last known static shape may be used to initiate the dynamic shape measurement to an optimum starting shape.

If only acceleration sensors are present (no local angle sensors), then static and dynamic shape will in general be unknown during dynamic shape changes. However, the invention provides valid dynamic shape with only accelerometers in the case where a uniform acceleration field is present, even if the field changes in time. Thus, by uniform acceleration field we mean a spatially uniform acceleration field. An example is a vertical array of sensors in a borehole in a homogeneous bed of rock undergoing spatially uniform horizontal earthquake vibration. In this case all of the tilt sensors will be subjected to the same acceleration from the vibration, and constant acceleration from gravity, so it is possible to extract static shape information from the array during the event, as will be described herein.

In one embodiment of the present invention there is provided a sensor array having at least one field-measuring sensor adapted to be within at least one external reference field and at least one curvature-measuring sensor adapted to be within a flexible substrate, the field-measuring sensors capable of providing orientation data of the flexible substrate relative to the field and the curvature-measuring sensors capable of providing orientation data between portions of the substrate for measuring dynamic and static shapes.

Preferably, the field-measuring sensors are single, dual, or triple axis accelerometers capable of providing vibration and shape data, and the substrate includes portions and the field-measuring sensors further include magnetometers adapted to provide orientation data of the portions of the substrate within a set magnetic field.

It is also preferable the curvature-measuring sensors are fiber optic bend and twist sensors, the curvature measuring sensors are dual-axis or single-axis bend sensors and the number of curvature-measuring sensors is minimized for measurement by field-measuring sensors.

Desirably, the accelerometers sense tilts in the world coordinate system and provide vibration acceleration data and constant acceleration of gravity data.

In the above embodiment, it is also desirable the flexible substrate is adapted to twist minimally and the array is capable of being calibrated for field installation on surfaces and in volumes for measurement, the surfaces and the volumes are geotechnical and structural civil engineering systems.

Alternatively, the surfaces and volumes are boat sails or human or animal bodies.

It is preferable the accelerometers are mounted in non-contiguous rigid substantially vertical pipes connected by flexible tubing and the accelerometers provide two degrees of freedom tilt and acceleration data relating movement of the long axes of the pipes relative to a vertical axis.

Alternatively, it is preferable the accelerometers are mounted in non-contiguous rigid substantially horizontal pipes connected by flexible tubing and fitted with alignment surfaces for alignment with substantially horizontal surfaces and the accelerometers provide two degrees of freedom tilt and acceleration data relating movement of the substantially vertical axes of the substantially horizontal pipes relative to a vertical axis.

In the above embodiment it is also desirable the sensors are attached to the flexible substrate so as to freely bend in two degrees of freedom and twist, the substrate is a volume of earth or water and the sensors are arranged in substantially vertical or horizontal flexures describing curves within the volume, and wherein data from each curve is sent to a common collection point, to collect data on the static and dynamic shape of the volume.

Further to the above embodiment, it is desirable the data is sent by way of a communication channel to the collection point, and the communication channel communicates with a wire or wirelessly.

The sensors are adapted to measure an earthquake and the sensors measure movement of the earth before, during and after said earthquake.

In another embodiment of the present invention there is provided a sensor array having field-measuring sensors within a flexible substrate, the field measuring sensors capable of providing orientation data for the substrate and adapted to define a dynamic shape from differences in signals within adjacent portions of the substrate.

In the present invention there is also provided a method of measurement of static and dynamic shapes of deformation and acceleration comprising the steps of: utilizing the array as described herein above for measurement.

The present invention provides for the use of the sensor array of the present invention for measuring static and dynamic shapes in geotechnical, structural and biological bodies.

In any of the above embodiments, it is desirable the flexible substrate comprises an articulated arm comprising rigid links containing field-measuring sensors, connected by rotatable joints, the articulated arm being connected to a fixed reference surface by a joint rotatable in one degree of freedom fitted with a rotation sensor, wherein the links are constrained to maintain the field sensors within a predetermined range, for the purpose of measuring the position and orientation of the articulated arm within the field.

Desirably, in the above embodiment the field-measuring sensors are dual or triple axis accelerometers and the rotation sensor is a digital shaft encoder, and the rotatable joints are fitted with curvature sensors for increased accuracy when measuring dynamic shapes.

BRIEF DESCRIPTION OF THE DRAWINGS

Having generally described the present invention herein above, reference will now be made to the accompanying drawings.

DETAILED DESCRIPTION OF THE INVENTION

Figure 1:
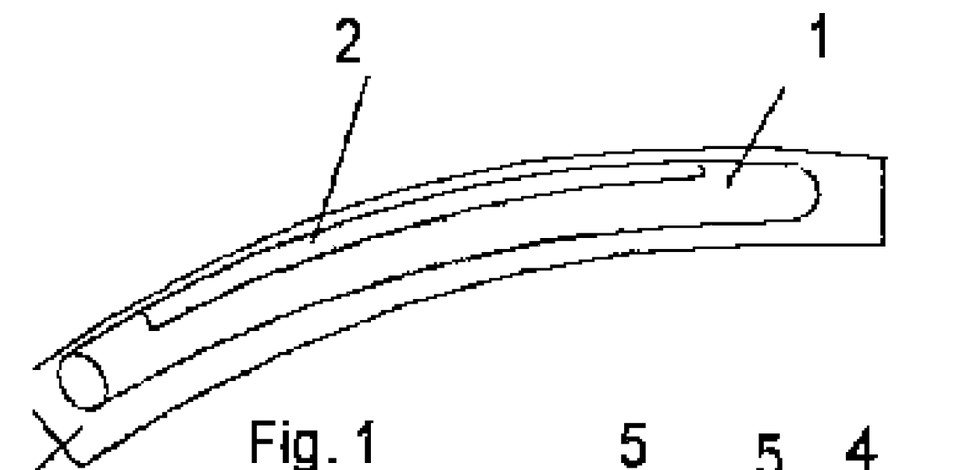
FIG. 1 illustrates a fiber optic sensor known in the prior art of local bend.

FIG. 1 shows a fiber optic sensor capable of sensing bend which is described in detail in Danisch '257. It comprises a fiber 1 treated to lose light on one side through a loss zone 2, preferably along the entire length over which bend is to be sensed. The optical design is such that bend is integrated along the treated portion of the fiber. The optical intensity transmitted through the fiber is modulated according to the net angular displacement between ends of the treated region, regardless of path. The sensor may be attached to a bendable substrate 3 to sense the bend of the substrate.

Figure 2:
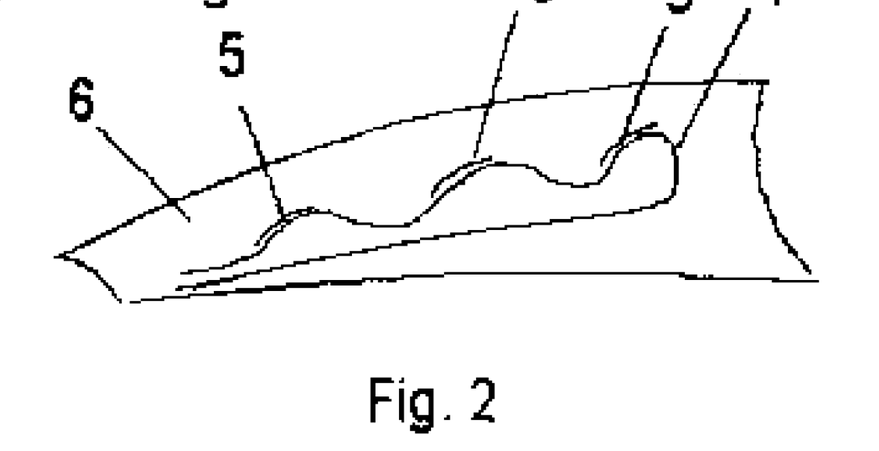
FIG. 2 illustrates a fiber optic prior art sensor of local bend and twist.

FIG. 2 shows an extension of the bend-sensing method of FIG. 1, which is explained in detail in Danisch '672. An optical fiber 4 has been sinuated along a substrate within a sensing region which is approximately the full length of the sinuations shown. On portions 5 of the fiber 1 approximating a 45 degree orientation to the long axis of the substrate, the fiber is treated to sense curvature, which in this case will include components of bend and twist of substrate 6. A second fiber on the opposite side of the substrate is sinuated in opposite fashion, so that its approximately 45 degree portions 5 form approximate X shapes with the first fiber. Danisch '672 describes a method for extracting bend and twist as separate data from the pair of sensors. The bend and twist sensing substrate may be used to sense 2 DOF curvature between two rigid bodies. It is also possible to connect a fiber optic 'rope' between two rigid bodies using methods described in Danisch '107. The rope may be treated to be sensitive to bend in 2 DOF or to also sense twist for a total of 3 DOFS. It is possible also to connect two rigid bodies with other bend-sensing technologies including but not limited to conductive rubber, potentiometers, rotary encoders, goniometers, and optical beams impinging on xy arrays.

In general, the above methods of sensing angles between rigid bodies are all means of sensing local angles, which may be sensed by various DOFs, including 1 DOF bend, 2 DOF bend, 2 DOF bend and twist, or twist alone, depending on the application. To refer to all of these generally we will use the term 'curvature' to denote a combination of bend and twist or of either bend or twist alone.

Figure 3:
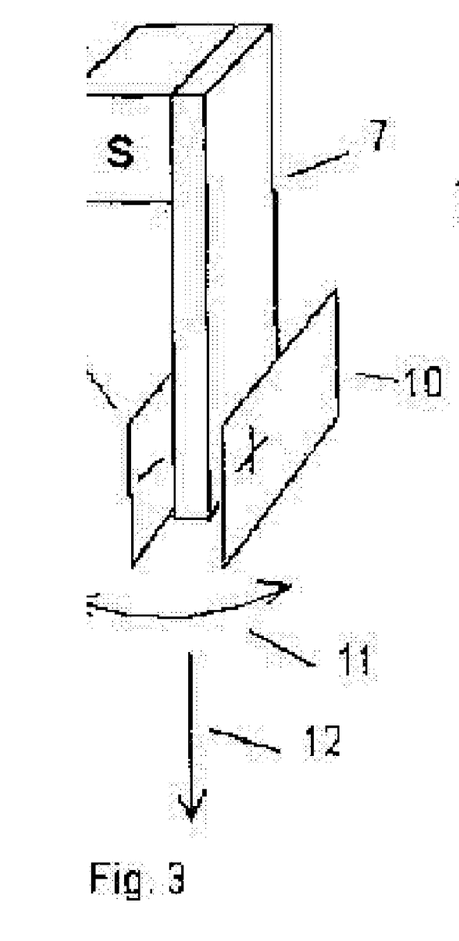
FIG. 3 illustrates a partial schematic view of a cantilever sensor of the present invention as a MEMs accelerometer.

As set out earlier WCS angles may be sensed by MEMs accelerometers. A MEMs sensor is micromachined in silicon using semiconductor integrated circuit technology. FIG. 3 shows a schematic diagram illustrating the principle of a MEMs accelerometer. A conductive, bendable cantilever 7 is anchored to a reference frame 8, marked with an "S" in the figure to indicate that a signal will be present there. The reference frame 8 is mechanically attached to the case of the sensor (not shown), but is conductive and carries the charge present on the cantilever 7. Capacitive fields between two oppositely charged plates 9 and 10 (marked with "−" and "+", respectively) near the cantilever 7 are unbalanced by movement of the cantilever 7 resulting in a potential at S that indicates proximity to one plate or the other (9, 10). The cantilever 7 is bent by acceleration in an arc shown by double arrow 11, which results from a gravity field such as indicated by arrow 12 or from changing velocity of the case of the sensor. If the cantilever 7 is vertical as shown, the output signal is at an intermediate level. If the cantilever 7 is tilted so that it approaches the + plate (10), the signal increases. If it is tilted the other way, the signal decreases. The output S in a gravity field is:

$$S = \text{gain} \times g \times \sin \theta \quad [\text{eq. 1}]$$

where gain is a calibration constant, typically 0.0034, which depends on the mass, material, and dimensions of the cantilever and details of the circuitry, g is the acceleration of gravity (typically 9.8 m/sec/sec), and theta is the angle in radians relative to vertical.

Figure 4:
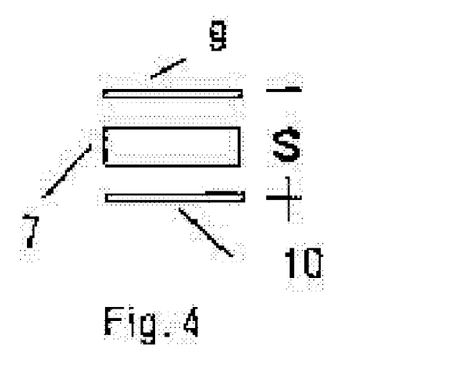
FIG. 4 illustrates a top view schematic of the cantilever sensor of FIG. 3.

FIG. 4 shows a schematic of the same MEMs accelerometer of FIG. 3 viewed from the top.

Figure 5:
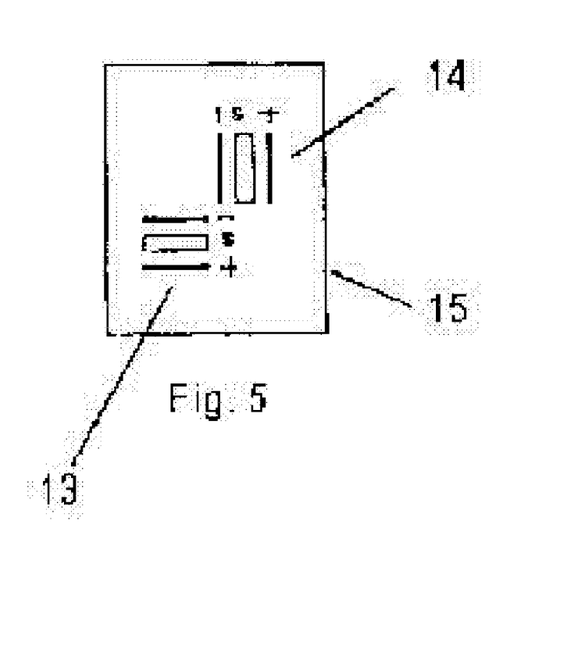
FIG. 5 illustrates a top view schematic of an alternative embodiment of the present invention having a pair of cantilever sensors forming an orthogonal pair of MEMs accelerometers.

FIG. 5 shows a top view of two schematic acceleration sensors arranged orthogonally to sense tilt and acceleration in 2 DOFs. Typically, both sensors are in the same case 15, typically a small surface-mountable case a few millimeters on a side.

The prior art tilt and acceleration sensing method described above may be extended to more DOFs by adding a third accelerometer orthogonal to an orthogonal pair of accelerometers. Further, orientation to the magnetic field of the earth or to an artificial magnetic field may be sensed by adding a magnetometer, which is also available commercially in a small integrated package. In addition, it is possible to add gyroscopic sensors and angular rate sensors.

A cantilever sensor as shown in FIG. 3 is maximally sensitive to changes in angle when it is vertical (aligned with the gravity field 12). It has maximum output (positive or negative) when oriented orthogonally to the gravity field, but changes with angle are minimal in this condition. Both effects are consequences of the shape of the sine function, which is steep near zero crossings but with a low slope near maxima and minima.

Positive and negative changes from vertical are distinguished by a cantilever accelerometer, because they increase or decrease the signal respectively from its intermediate vertical state, but angles beyond 90 degrees from vertical cannot be distinguished from angles less than 90 degrees from vertical. Thus, 'upside down' is indistinguishable from 'right side up', even for an orthogonal pair of sensors. However, if a third orthogonal accelerometer is added to form a triad of sensors the ambiguity is resolved.

Even a triad of sensors cannot resolve WCS orientation about the gravity vector (i.e. rotations within a horizontal plane). This angle requires the addition of a magnetic sensor to measure the orientation of the magnetic field of the earth or an artificial magnetic field.

Two rigid bodies 16 and 17 connected by a curvature sensor 20 to sense local angles between them may also be fitted with accelerometers and magnetometers to sense WCS angles. This is shown in FIG. 6, where the curved line 20 represents a sensor of bend, bends, and/or twist and 18 and 19 represent accelerometers (single, double, or triple) with the optional addition of magnetometers.

The 3D curve 20 between the rigid bodies can be modelled as a polyline with a total length of the unbent length of the curvature sensor when straight. If only planar bend is present, the net bend may be distributed evenly along the polyline by interpolation yielding a circular arc. If bend and twist are present they may be distributed evenly along the polyline, yielding a portion of a helix. Alternatively, spline or other interpolation functions may be used to distribute the bend and twist.

Figures 6, 7, 8:
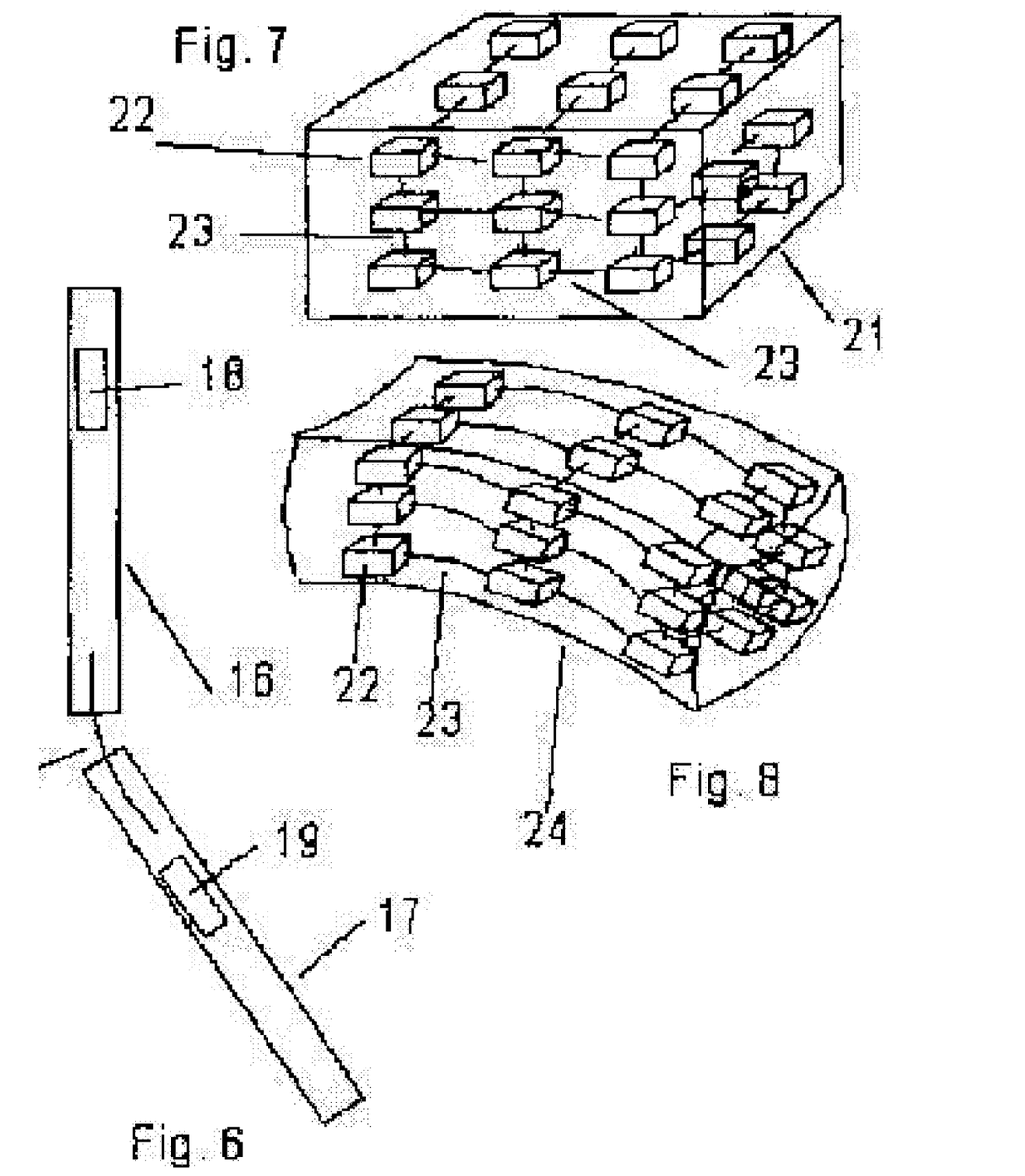
FIG. 6 illustrates another embodiment of the present invention having two rigid bodies having accelerometers and separated by a bendable region having a curvature sensor.
FIG. 7 illustrates a volume of flexible material capable of being bent and twisted and being fitted with a plurality of accelerometers connected by plurality of curvature sensors when in an unflexed state.
FIG. 8 illustrates the volume of flexible material in FIG. 7 when in a flexed state.

FIG. 7 shows a more general placement of local and WCS sensors within a deformable volume 21 such as a rectangular prism made of rubber. Local sensors 23 may extend between WCS sensors 22 in numbers and locations required by the degrees of freedom to be sensed. Some of the sensors in the figure have been omitted to simplify the drawing. The WCS sensors may be modelled as small rigid bodies with curvable material in between. Compression or extension cannot be measured by this method unless compression and extension sensors are added, but bend and twist of the volume are measured as changes of local and WCS angles. FIG. 8 shows the volume in an example of a deformed state. The WCS sensors are tilted and the local angle sensors are bent and/or twisted. The shape of the deformed volume may be modelled by 'path calculation': polylines are formed along the curves connecting the WCS sensors. A string of sensors connected by bendable elements within a borehole is a subset of the general volume sensor described above.

Figure 9:
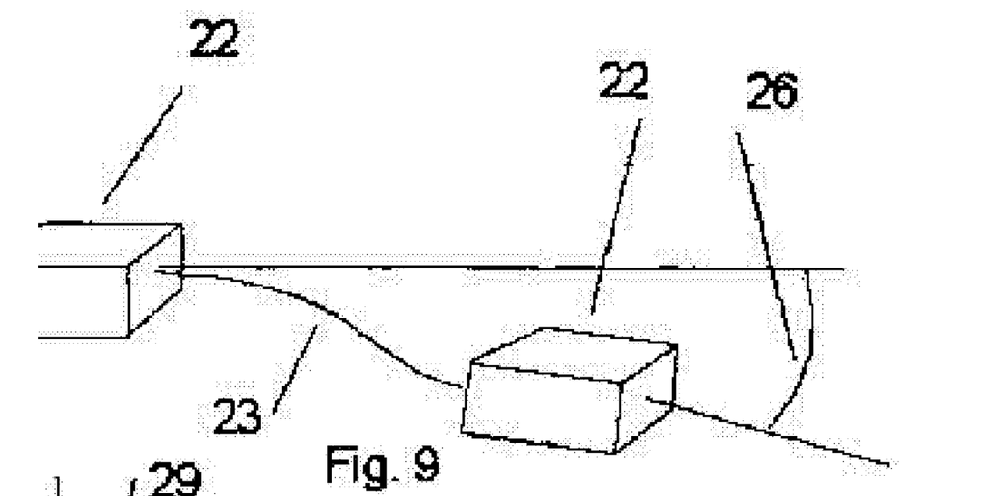
FIG. 9 illustrates two acceleration-sensing units of FIG. 8 showing distances and angular orientation between them.
Figure 10:
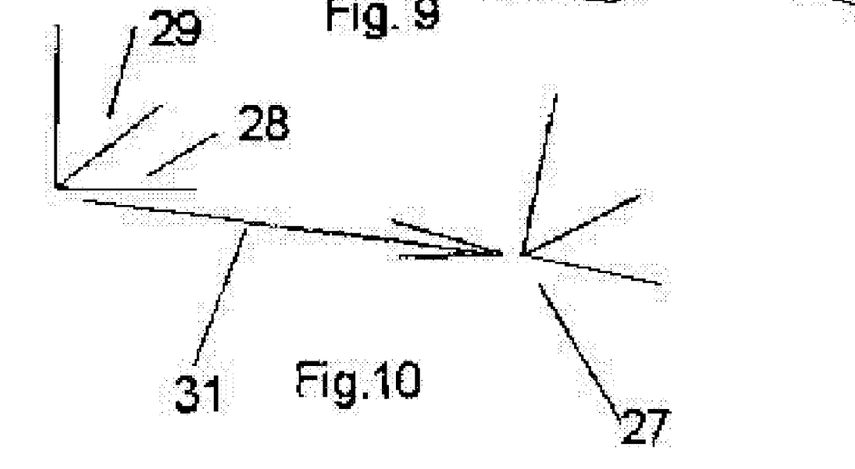
FIG. 10 illustrates two sets of orthogonal unit vectors and a distance vector therebetween representing orientation and position information, respectively, between the two rigid bodies.

FIG. 9 shows two of the WCS sensors 22 in a volume with a local curvature sensor 23 in between. The angle between the two rigid bodies containing the WCS sensors is represented by angle 26. In general, each of the WCS sensors is a rigid body which has a 3 DOF orientation in the WCS and the difference between the orientations may be described using roll, pitch and yaw numbers. However, because roll, pitch and yaw are subject to indeterminate pole conditions it is less ambiguous to use orientation vectors, as shown in FIG. 10. Each rigid body can be described by a set 27 of three orthogonal unit orientation vectors 28, 29, and 30. The 3D displacement between rigid body centers can be described with a 3D displacement vector 31, or if interpolation is used, by a polyline consisting of multiple 3D displacement vectors. A collection of such measurements for each WCS rigid body in a volume completely describes the shape of the volume. At each rigid body location within the volume, position and orientation are known, typically referred to the WCS as x, y, z displacements and rx, ry, and rz orientations, for a total of 6 DOF. rx, ry, and rz may be expressed as roll, pitch, and yaw, or as a triad of unit orientation vectors (each triad contains nine numbers, three of which are redundant, but the nine represent 3 DOF).

With magnetic field sensors at some or all rigid body locations, the orientation of the volume around the gravity vector will be known. It is not necessary to sense magnetic orientation at each WCS sensor location. If magnetic orientation is known for one sensor, path calculation may be sufficient to place every sensed portion of the volume in a correct magnetic orientation. It should also be clear that not all DOFs need be sensed at every sensor location if they are not needed for shapes of interest. Thus, a mechanical system that does not twist does not need twist sensors, or another system may only need a single DOF of bend at each local angle sensor location. Often, orientation in the earth's magnetic field need not be known.

This invention teaches that static shape and dynamic shape may be determined at all times for a deformable volume by a collection of WCS and local angle sensors distributed at intervals within the volume at known 6 DOF locations. When the shape is not changing, the WCS sensors may be used alone. When the shape is changing, a combination of WCS and local sensors may be used, and in some dynamic cases, either WCS or local sensors may be used alone. Further, dynamic acceleration information along WCS axes may be obtained from the array when the WCS sensors are accelerometers.

Moreover, static shape can be determined from WCS information alone by applying Equation 1 below, the characteristic equation of the output signal:

$$\theta = a\sin(s/(\text{gain} \times g)) \quad [\text{Eq. 1}]$$

to obtain tilt angles at each rigid body location, and then modelling polylines that 'pass through' (satisfy) the 6 DOF data at each rigid body. This method works also for very slow changes in shape that do not significantly accelerate the sensors compared to the acceleration of gravity.

For more rapid changes, if there are also local curvature sensors installed, the curvature sensors may be used to calculate the shape, as deviations from the last valid shape sensed by the WCS sensors before rapid changes began. In this case local curvatures are used to calculate polyline paths that satisfy the rigid body separation distances.

If the WCS sensors are accelerometers, then acceleration may be obtained directly as a combination of static gravity modulated by the tilt at that instant, and the applied acceleration signal such as an earthquake vibration or motion of a limb to which the sensors may be attached. Acceleration can be calculated as the total signal without temporal filtering, minus the signal with temporal filtering. This acceleration signal is the acceleration measured by the accelerometers in a rigid body, which can be tilted relative to the axis of the vibration field. For instance, in a borehole a given rigid body is at an angle of 10 degrees from vertical and the vibration may be horizontal. In such a case, if the tilt is known, then a correction may be performed to find the horizontal component of the vibration. If a MEMs accelerometer is tilted by an angle of theta with respect to the vertical, and undergoes an acceleration 'a', its output is $$S = \text{gain} \times g \times \sin\theta - 1 - \text{gain} \times a \times \cos\theta \quad [\text{Eq. 2}]$$

This may be solved to find the acceleration, 'a', if theta is known from a calculation along the path described by the local sensors.

It is also of interest to use Eq. 2 to find the local angles when no local angle sensors are present, but a uniform acceleration is applied. This has already been described for a uniform static acceleration of gravity (Eq. 1), but includes the method of determining local angles from the signals using pairwise applications of Eq. 2 for adjacent pairs of rigid bodies fitted with MEMs or other rapid accelerometers. In this case, two new equations are formed:

$$S1 = \text{gain1} \times g \times \sin(\theta 1) + \text{gain1} \times a \times \cos(\theta 1); \quad [\text{Eq. 3}]$$

$$S2 = \text{gain2} \times g \times \sin(\theta 2) + \text{gain2} \times a \times \cos(\theta 2); \quad [\text{Eq. 4}]$$

Where subscripts of "1" denote a first rigid body, subscripts of "2" denote a second rigid body, and both equations are for the same DOF of each rigid body, e.g. for the "x" sensor of each "xy" pair of sensors in a MEMs integrated circuit. To obtain the local angle Eq. 5 is used:

$$\Delta\theta = \theta 1 - \theta 2, \quad [\text{Eq. 5}].$$

Eq. 5 permits solution of a polyline path for the dynamic data and thus the dynamic shape.

The pair of equations may be solved rapidly for $\Delta\theta$ using iterative numerical techniques, if the common acceleration 'a' is known. If theta1 is expressed as theta+del and theta2 is expressed as theta−del, then del may be varied until the difference S1−S2 is arbitrarily close to the difference of the right hand sides of Eq. 3 and Eq. 4. Then deltatheta will be known and the dynamic shape may be determined by path calculation.

The common acceleration may be obtained from the reference sensor for the polyline (the first vertex of the polyline). For instance, if a string of sensors is in a borehole and the top sensor is affixed vertically to the earth at its surface, then it may be used as the reference for the beginning of calculation and may also be used to indicate an overall s-wave acceleration parallel to the surface of the earth. To the extent that the acceleration is uniform at all the sensors, the calculation of dynamic shape will be accurate and no bend or twist (local) sensors will be required to perform it. Cost is reduced by a reduction in the type and numbers of sensors in the calibrated array by this method.

It is also possible to calculate dynamic shape from accelerometer signals using double integration techniques well known in accelerometer technology. Each dynamic acceleration signal may be integrated once to find velocity and again to find position. However, if the angle of each rigid body in each DOF is not known then the acceleration will be reduced by the cosine of the angle of the cantilevers relative to vertical, if horizontal acceleration is sought.

In borehole sensing for earthquake and slope monitoring, and for many structural monitoring applications, the cantilevers of accelerometers in rigid bodies will usually be approximately vertical and will not move by more than 45 degrees from the vertical. In most cases there is no need for twist measurement so dual-axis accelerometers can be used in pipes connected by short flexible hoses and an element that reduces twist. If twist is not permitted or needed the system may be built as a single structure that can be calibrated as a field-installable unit and rolled up for transport or storage. If twist must be sensed local twist sensors between rigid bodies will be required or magnetometers must be added.

Figures 11, 12, 13:
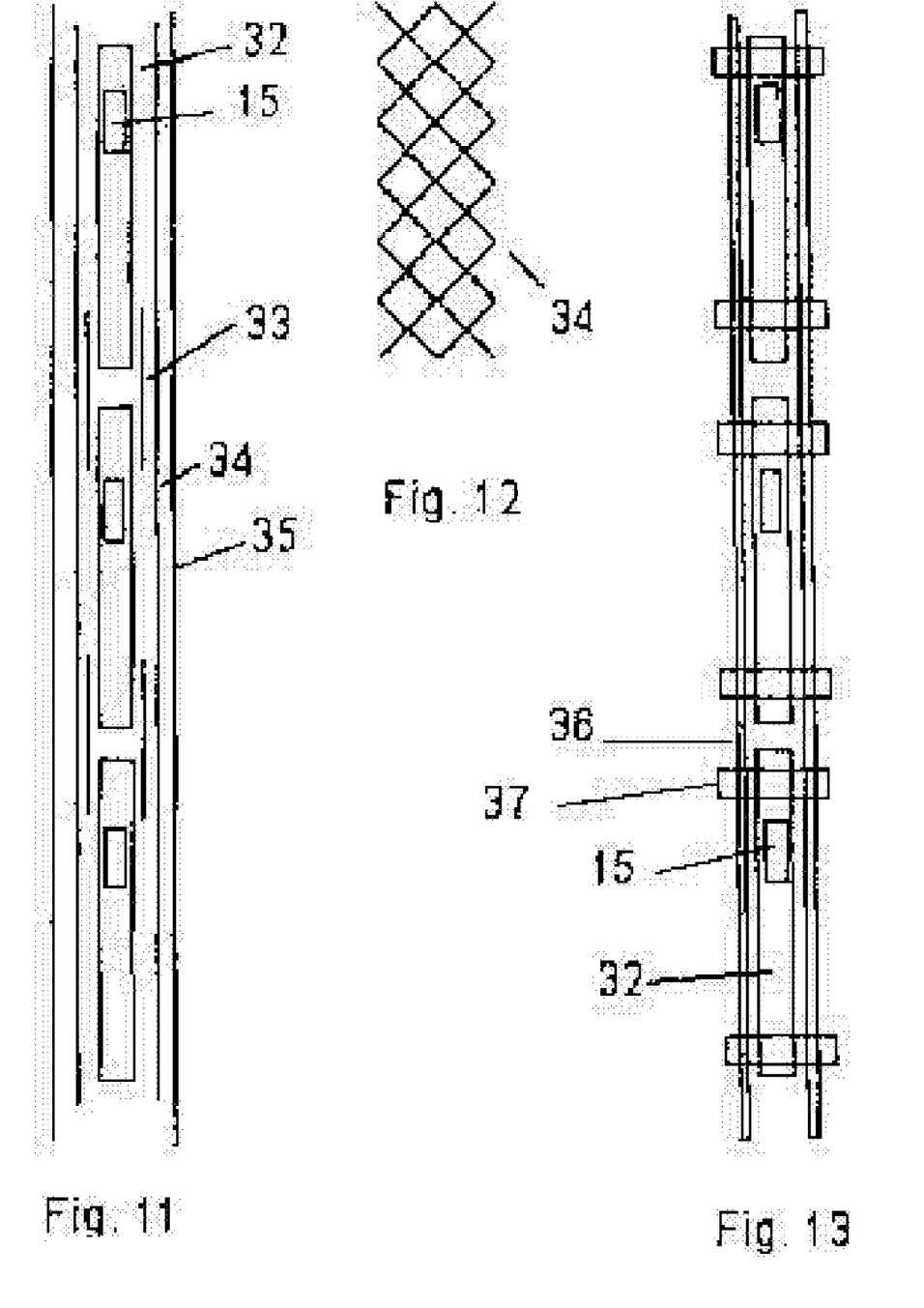
FIG. 11 illustrates a sensor array in a flexible enclosure for vertical measurements using shrinkable tubing.
FIG. 12 illustrates a braid for imparting shielding and torsion resistance.
FIG. 13 illustrates a sensor array in a flexible enclosure clamped from the outside.

FIG. 11 shows a diagram of an array designed to minimize twist and minimize the number and type of sensors. Dual-axis accelerometers 15 are mounted in thin-wall metal pipes 32 forming rigid bodies that include sensing of tilt and acceleration in 2 DOF. Pipes with an inside diameter of 12 mm or less are large enough to hold the sensors and associated wiring and circuitry. The pipes are separated end-to-end by a distance sufficient to permit bending, typically to a limit of 45 degrees within their coverings. Typically, the separation is 5-10 mm. The coverings include short sections of tight-fitting flexible tubing 33; for example heat shrinkable tubing with integral adhesive sealer as a first layer. A second layer 34 of circular metal braid is shown in detail in FIG. 12, which provides an overall electrical shield held in contact with the metal tubes by a third layer of flexible tubing 35, which is, for example, also heat shrinkable tubing. The flexible tubings provide sealing against the elements. Each can be fitted with water-tight end caps (not shown). The metal braid, which is maintained in a nearly cylindrical shape by the coverings, significantly reduces twist at the joints and provides protection against over-bending. The double flexible tubings provide two barriers to moisture penetration.

Alternatively, as shown in FIG. 13, the pipes 32 can be covered by a flexible hose 36 which is clamped with metal clamps 37 from the outside to each pipe. The flexible hose can include a metal or polymer braid to reduce twisting and provide strength. A metal braid can also be included inside the hose in contact with the pipes to provide electrical shielding. Optionally, FIGS. 11 and 13 can further include bend sensors at the flexible joints.

Figures 14, 15:
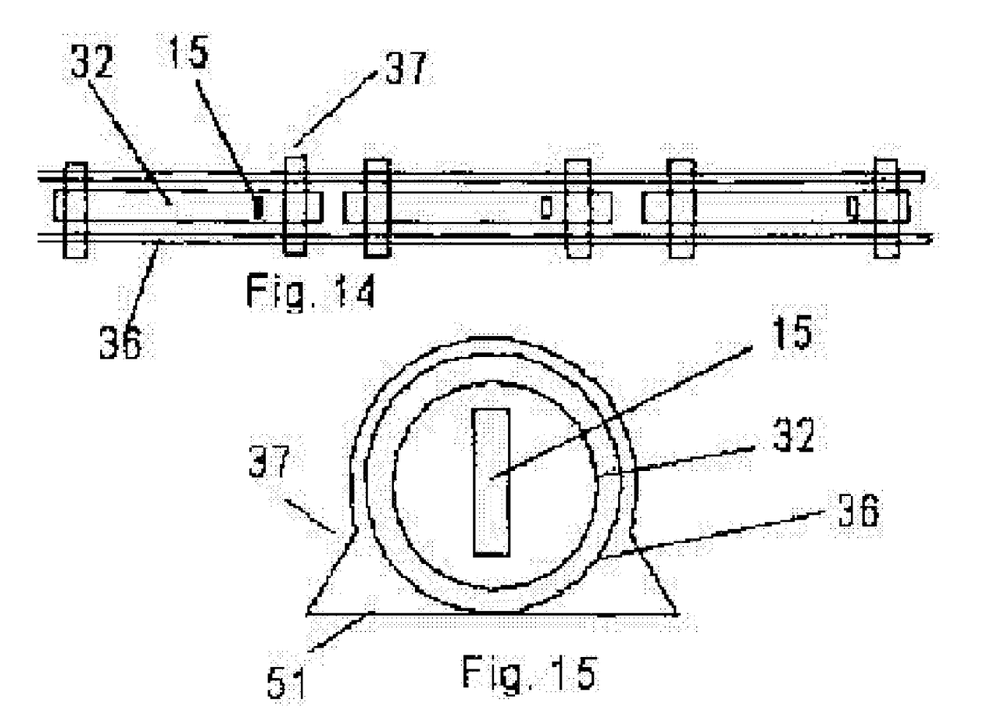
FIG. 14 illustrates a sensor array in a flexible enclosure for use in horizontal measurements.
FIG. 15 illustrates a clamp modified to provide registration to a surface.

When the array must be horizontal or within approximately 45 degrees of horizontal, another arrangement must be used because the accelerometers in the arrays of FIGS. 11 and 13 will not measure properly when the pipes are horizontal (the change in signal for a change in angle will be small and of indeterminate sign). In this case, shown in FIG. 14, the accelerometers 15 should be mounted so their cantilevers are vertical when the pipes 32 are horizontal. Outside fittings may be added to orient the pipes so the accelerometer cantilevers are vertical when the fittings rest on a horizontal surface. This is shown in FIG. 15 where a clamp 37 has been modified to include a horizontal surface 51. In many cases, a sensor of this type may operate within a plane and need be fitted only with single-axis accelerometers to measure a single DOF of WCS angle of each pipe. Normally the pipes will be separated by a greater distance and the braid may be reduced or eliminated if dual accelerometers are used to encourage twist at each flexible joint. Then 2 DOFs of orientation are sensed at each pipe and a non-planar path can be sensed and calculated. Twist and bend sensors can be added for local curvature determination. Applications for horizontal sensors include monitoring of buildings, landfills, slopes, mines, bridges and tunnels. The above clamping system with flat fixturing can also be used for vertical arrays such as to attach a vertical array to a vertical wall.

Figures 16, 17:
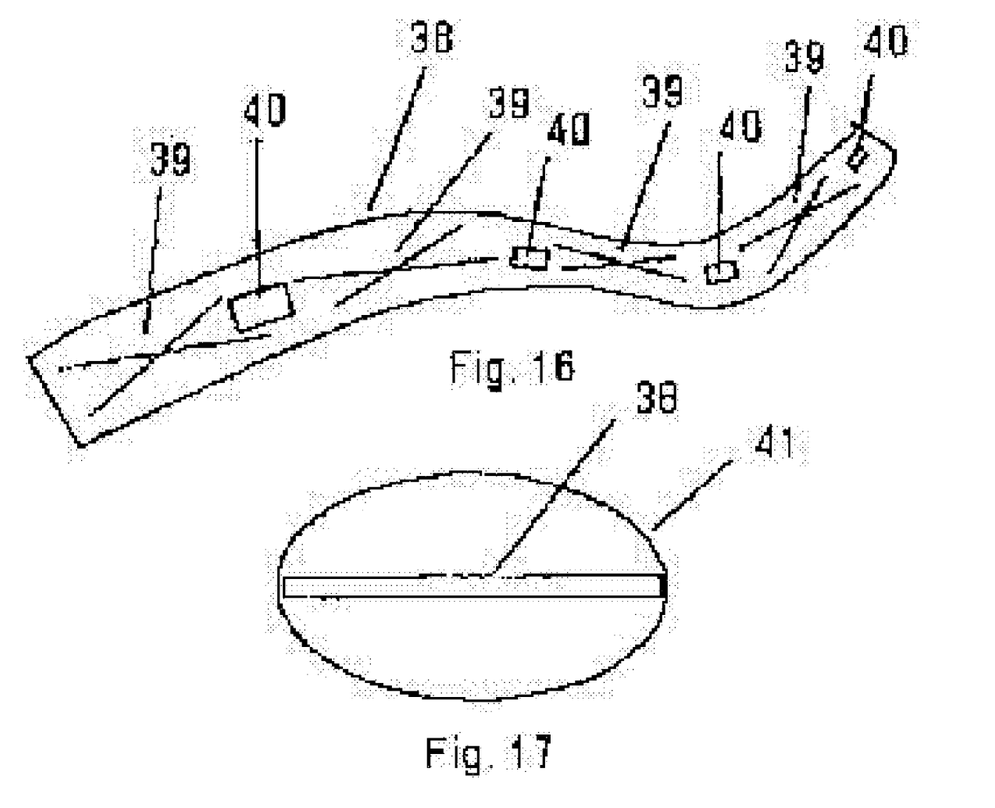
FIG. 16 illustrates a sensor array on a ribbon-like flexible substrate.
FIG. 17 illustrates the ribbon of FIG. 16 in an oval protective hose.

Accelerometers can be added to a sensory ribbon or rope. Sensory ribbons and ropes are described in Danisch '672 and Danisch '107. The addition of accelerometers to a ribbon 38 is shown in FIG. 16 with the bend-twist sensor pairs 39 which are described in further detail in Danisch '672. Single, dual, or triaxial accelerometers 40 are positioned at known intervals along the flexible substrate. When the substrate is not moving the accelerometer signals can be used to calculate WCS orientations with great accuracy. The WCS orientations may be used to 'hone' the data from the local bend and twist sensors to an initialized state, thereby improving its accuracy when the shape is in motion. Signals from the local bend and twist sensors may be used to determine that the shape is indeed static, thereby enabling automatic homing whenever the static condition prevails. The local sensors may also be used to resolve ambiguities of the accelerometers when some of the accelerometers are near poles, upside down, and the like. Magnetometers may be added to resolve rotations about the gravity vector, but in many cases it will not be necessary to add them because accuracy will be improved greatly if only some of the DOFs are 'honed.'

A ribbon-shaped substrate as described in Danisch '672 may also be used with accelerometers alone (no local bend and twist sensors) to form a vertical or horizontal sensory array. The array will look like FIG. 16 without the (X-shaped) sensor pairs 39. The accelerometers may be single, dual, or triaxial accelerometers. If the ribbon is vertical and magnetometers are not used it will normally be used to sense planar bend because twist about the gravity vector cannot be resolved without magnetometers. If the ribbon is horizontal, dual axis accelerometers with cantilevers vertical can determine bend and twist from differences in WCS tilts. Mathematics normally used with ribbons with local bend and twist sensors can then be used with the data derived from WCS sensors. As shown in FIG. 17, the ribbon 38 may be housed in a hose with oval cross section 41 supported at its edges within the long axis of the oval.

Figure 18:
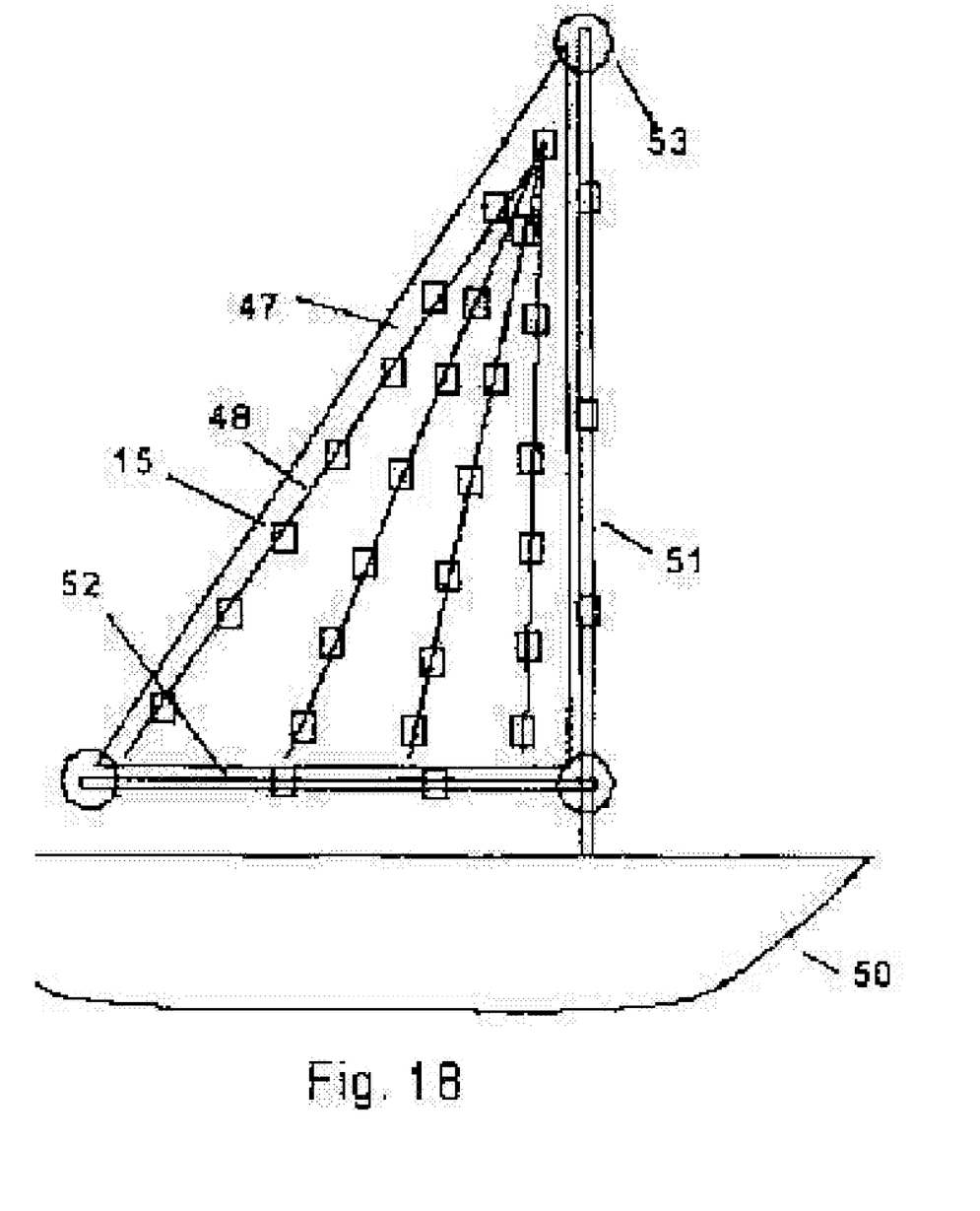
FIG. 18 illustrates the present invention in use with a sailboat.

In a sail-measuring application, as shown in FIG. 18, accelerometers may be attached to the sail of an aquatic sailing vessel 50 to measure its static and dynamic shape for purposes of measuring and thereby improving sailing performance through control of design or tensioning of sails. The accelerometers can be dual-axis pairs 15 mounted along lines that radiate from the top of a triangular sail 47 to points spaced along the approximately horizontal boom 52 at the bottom of the sail. Other sensors, as described herein above, can also be added to the mast 51 and boom 52 to resolve their shapes and absolute orientations. For instance, orientation sensors 53 comprised of magnetometers, triaxial accelerometers and angular rate sensors, can be used to reference to the magnetic field, and to provide an absolute orientation of the mast and boom in two vertical DOFs. Preferably on the sail, and many parts of the mast and boom, cost and weight will be reduced by using accelerometers 15 in preference to orientation sensors. On the sail, the accelerometers will be used to calculate the static and dynamic shape of each of the lines along the sail. Taken together, the lines 48 form into 3D curves when the sail is not perfectly taut and describe the 3D shape of the sail. In combination with the orientation sensors, the shape may be placed into absolute 3D coordinates that account for the roll, pitch, and yaw of the vessel. The orientation sensors also resolve poles, which may occur if the vessel is keeled over and some sensors become inverted, and ambiguity due to otherwise unknown magnetic heading.

Figure 19:
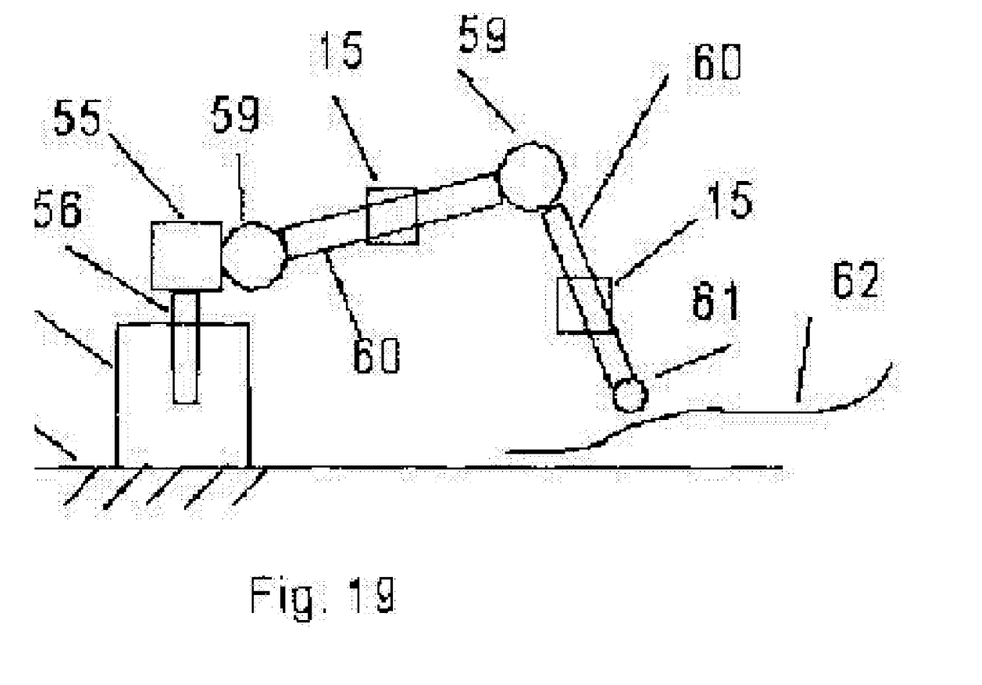
FIG. 19 illustrates the present invention for use as an endpoint-measuring application.

In another example shown in FIG. 19, accelerometer pairs 15 are mounted to rigid arms 60. The arms are attached to joints 59 and free to rotate only in vertical planes. Only two arms are shown for simplicity. The arms are attached to a support body 55 attached to a shaft 56 free to rotate in a bearing 57 about a vertical line. The shaft is attached to an angle-measuring sensor (not shown) that measures the angle of the shaft in the horizontal plane. Suitable angle-measuring sensors include potentiometers, shaft encoders, and fiber optic twist or bend sensors. Alternatively, a magnetometer can be used to measure the angle of the shaft in a magnetic field. The bearing is attached to a stationary surface 58, which forms the reference surface for measurements. If the lengths of the arms are known the tilt angles measured by the accelerometers and the rotation angle of the bearing are sufficient to determine the x, y and z coordinates of an end tool 61, such as a smooth ball or pin, which can be scanned along a surface 62. The data set resulting from the scan can be used to describe the surface in three dimensions. Instead of rotating in only vertical planes, the joints 59 can be modified to allow rotation in two degrees of freedom, so that the readings of the accelerometer pairs combined with the readings of the bearing can be used to describe not only the x, y, and z location of the end tool, but its absolute inclination in 3D space, so that 6 degree of freedom data are available for the end tool. To avoid ambiguity, the arms must not be allowed to pass through a horizontal state, or alternatively, triaxial accelerometers may be used to resolve the ambiguity concerning upward-heading or downward-heading arms. The data may be obtained to great accuracy for static poses of the arms, and to lesser but still useful accuracy when the arms are moving. Greater dynamic accuracy can be achieved by adding bend sensors, such as fiber optic bend sensors, at the joints between arms. The system of arms can be used to scan surfaces or to track the position and orientation of a point on a moving body. For instance, the system may be used to measure coordinates of points on a patient in preparation for surgery, or to track the position and orientation of a point on the patient in order to stabilize x-ray, magnetic resonance, or other medical imagery of the patient's chest or other region while the patient breathes or shifts position. In other applications the system can form part of an endoscope or other probe in order to track the position and orientation of the end of the probe or of parts of the probe.

When the system of FIG. 19 is used to track the position and/or orientation of a point, the movement will comprise small movements about a central point in many cases. For example, the breathing patient referred to will make small movements about a central point, so that the joints of the measuring system will move only small distances as modifications to a static pose describing a point on the patient's chest in the middle of the breathing cycle. In these cases, the accelerations due to movement will form a repeating pattern that will be discernable from the static accelerations, thereby allowing a dynamic measurement of shape and position even though the accelerations do not represent an overall common field.

The pipes in arrays like those of FIGS. 11, 13 and 16 can be calibrated by holding them vertical and measuring their outputs to find the intermediate voltage representing vertical. If temperature sensors are incorporated in some or all of the pipes the pipes can be subjected to different temperatures to derive a calibration factor for temperature. The pipes can be rolled on a horizontal surface to find maximum and minimum values of the signals and each pipe may be marked to indicate x and y axes corresponding to maxima and minima (x and y are arbitrary designations of orthogonal axes describing a polyline in two dimensions. Z is used to describe the vertical dimension of a vertical array). After the pipes are assembled into a complete array, the array may be rolled on a horizontal surface until a first accelerometer in a first pipe has a maximum signal. The first pipe is then marked to indicate the x axis. The array is rolled until a first accelerometer in a second pipe has a maximum output. The x and y outputs of the first pipe are recorded for this condition and the procedure repeated for each pipe until a table of first-pipe x and y values are obtained. These values can be used to calculate the angular offsets of pipes about their long axes after assembly. The values are used to correct for these offsets by rotating data from x and y tilt sensors in each pipe about its axis using rotational correction equations:

$$sx = sx \times \cos(\text{roll}) - sy \times \sin(\text{roll});$$ [Eq. 6]

$$sy = sy \times \cos(\text{roll}) + sx \times \sin(\text{roll});$$ [Eq. 7]

where sx is the output of the x sensor of a dual axis accelerometer, sy is the output of the y sensor of a dual axis accelerometer, and roll is the angular offset about the long axis of the pipe. The process may be automated by rolling the array at a known rate or measuring its rotational angle during rotation and measuring the maxima and minima or zero crossings of sensors at known rotational angles. If the array is to be for horizontal use, such as in FIG. 14, the intermediate voltage is found by placing the pipes horizontal on a horizontal surface and rolling them to find maxima and minima and using an average to find the intermediate values. The roll offsets are found in a manner similar to the vertical arrays.

The above calibration step and the foregoing construction and the calculation methods result in a calibrated array that is field-portable, uses the minimum number and type of sensors for a given task, provides acceleration data along known axes, and can be used with minimum fixturing in the field to provide absolute shape data in static and dynamic conditions.

Several arrangements of the array include those of FIGS. 11, 13, 14 and 17, in which the sensors are arranged inside flexible tubing and provide data on a 3D curve beginning at a reference point, usually at one end of the curve such as the top end. A volume of earth, air, or water may be sensed by an array of such arrays. The signals from each array may be collected by microprocessors within or near the array. Arrays within a larger volumetric array can communicate all their data to a central point using wires or by wireless communication.

What is claimed is:

1. A sensor array comprising:
   at least two rigid bodies of predetermined lengths at predetermined intervals along a flexible substrate;
   at least two field-measuring sensors on each of said at least two rigid bodies responsive to two components of orientation within an external field of predetermined distribution of field strength and predetermined distribution of field orientation;
   said flexible substrate having a geometrical constraint restricting the rigid bodies to inter-body orientations of no more than two degrees of freedom and free from changes of orientations within said field about a field vector;
   said array determining the shape of the system from the lengths, intervals, and inter-body orientation angles, and the orientation of the system in an external coordinate system from the orientation of said at least two field-measuring sensors.

2. The sensor array of claim 1, wherein said field-measuring sensors are single, dual, or triple axis accelerometers.

3. The sensor array of claim 2, wherein said accelerometers sense tilts in the world coordinate system and provide vibration acceleration data and constant acceleration of gravity data.

4. The sensor array of claim 2, wherein said accelerometers are mounted in non-contiguous rigid substantially vertical pipes connected by flexible tubing and said accelerometers provide two degrees of freedom tilt and acceleration data relating movement of the long axes of the pipes relative to a vertical axis.

5. The sensor array of claim 2, wherein said accelerometers are mounted in non-contiguous rigid substantially horizontal pipes connected by flexible tubing and filled with alignment surfaces for alignment with substantially horizontal surfaces and said accelerometers provide two degrees of freedom tilt and acceleration data relating movement of the substantially vertical axes of said substantially horizontal pipes relative to a vertical axis.

6. The sensor array or claim 1, wherein the flexible substrate includes portions and said field-measuring sensors further include magnetometers adapted to provide orientation data of said portions of said substrate within a set magnetic field.

7. The sensor array old claim 1, wherein said curvature-measuring sensors are fiber optic bend and twist sensors.

8. The sensor array of claim 1, wherein said curvature-measuring sensors are dual-axis or single-axis bend sensors.

9. The sensor array of claim 1, wherein said array is capable of being calibrated for field installation on surfaces and in volumes for measurement.

10. The sensor array of claim 9, wherein said surfaces and said volumes are geotechnical and structural civil engineering systems.

11. The sensor array of claim 1, wherein said flexible substrate is a volume of earth or water and said sensors are arranged in substantially vertical or horizontal flexures describing curves within said volume, and wherein data from each curve is sent to a common collection point, to collect data on the static and dynamic shape of the volume.

12. The sensor array of claim 11, wherein said data is sent by way of a communication channel to said collection point.

13. The sensor array of claim 12, wherein said communication channel communicates with a wire or wirelessly.

14. The sensor array of claim 11, wherein said sensors are adapted to measure an earthquake and said sensors measure movement of said earth before, during and after said earthquake.

15. The sensor array of claim 1, wherein the flexible substrate comprises an articulated arm comprising rigid links containing field-measuring sensors, connected by rotatable joints, said articulated arm being connected to a fixed reference surface by a joint rotatable in one degree of freedom fitted with a rotation sensor, wherein the links are constrained to maintain the field sensors within a predetermined range, for the purpose of measuring the position and orientation of said articulated arm within the field.

16. The sensor array of claim 15, wherein said field-measuring sensors are dual or triple axis accelerometers and said rotation sensor is a digital shaft encoder.

17. The sensor array of claim 15, wherein said rotatable joints are fitted with curvature sensors for increased accuracy when measuring dynamic shapes.

18. The sensor array of claim 17 in which the flexible substrate is elongate and extends within 45 degrees of horizontal, wherein the at least two sensors are mutually-orthogonal accelerometers responsive to two orthogonal tilt angles relative to the gravity vector, and wherein the flexible substrate allows twist between adjacent rigid bodies for monitoring changes of orientation along the path of the flexible substrate.

19. The sensor array of claim 18, further including a third accelerometer on at least one of said at least two rigid bodies, orthogonal to the other two on said body, for reporting 3D vibration in addition to shape.

20. The sensor array of claim 1, in which the substrate is elongate and extends within 45 degrees of vertical, wherein the at least two sensors are mutually-orthogonal accelerometers responsive to two orthogonal tilt angles relative to the gravity vector, and wherein the flexible substrate restricts orientation changes between rigid bodies to two degrees of freedom of bend, for measuring three dimensional shape and two dimensional vibration.

21. The sensor array of claim 20, further including a third accelerometer on at least one of said at least two rigid bodies, orthogonal to the at least two sensors on said body for reporting 3D vibration in addition to shape.

* * * * *

UNITED STATES PATENT AND TRADEMARK OFFICE
CERTIFICATE OF CORRECTION

| | | |
|---|---|---|
| PATENT NO. | : 7,296,363 B2 | Page 1 of 1 |
| APPLICATION NO. | : 11/160401 | |
| DATED | : November 20, 2007 | |
| INVENTOR(S) | : Lee Danisch | |

It is certified that error appears in the above-identified patent and that said Letters Patent is hereby corrected as shown below:

Title Page:

Item (75); please delete; "Murray Lowery-Simpson" and insert; --Murray S. Lowery-Simpson--

Item (75); please insert; --Tarek H. Abdoun--

Signed and Sealed this

Fourteenth Day of July, 2009

JOHN DOLL
*Acting Director of the United States Patent and Trademark Office*